US012559185B2

(12) United States Patent (10) Patent No.: US 12,559,185 B2
Aubin-Marchand (45) Date of Patent: Feb. 24, 2026

(54) SUPPORT STRUCTURE HAVING A SEAL FOR A TRACK ASSEMBLY AND SUPPORT STRUCTURE HAVING A GUIDE RAIL

(71) Applicant: SOUCY INTERNATIONAL INC., Drummondville (CA)

(72) Inventor: Jeremie Aubin-Marchand, St-Hugues (CA)

(73) Assignee: SOUCY INTERNATIONAL INC., Drummondville (CA)

(*) Notice: Subject to any disclaimer, the term of this patent is extended or adjusted under 35 U.S.C. 154(b) by 413 days.

(21) Appl. No.: 18/203,758

(22) Filed: May 31, 2023

(65) Prior Publication Data

US 2023/0382474 A1 Nov. 30, 2023

Related U.S. Application Data

(60) Provisional application No. 63/347,100, filed on May 31, 2022.

(51) Int. Cl.
*B62D 55/084* (2006.01)
*B62D 55/088* (2006.01)
*B62D 55/108* (2006.01)

(52) U.S. Cl.
CPC ....... *B62D 55/0847* (2013.01); *B62D 55/088* (2013.01); *B62D 55/1086* (2013.01)

(58) Field of Classification Search
CPC ............ B62D 55/0847; B62D 55/0845; B62D 55/088; B62D 55/0887; B62D 55/1086; B62D 55/15
See application file for complete search history.

(56) References Cited

U.S. PATENT DOCUMENTS

| | | | | |
|---|---|---|---|---|
| 3,336,087 | A * | 8/1967 | Reinsma | B62D 55/108 305/109 |
| 3,601,454 | A * | 8/1971 | Reinsma | B62D 55/0847 305/105 |
| 3,764,184 | A * | 10/1973 | Orr | B62D 55/1086 305/138 |
| 3,985,402 | A * | 10/1976 | Reinsma | B62D 55/1086 305/138 |
| 12,091,110 | B2 * | 9/2024 | Aubin-Marchand | B62D 55/1086 |
| 12,269,543 | B2 * | 4/2025 | Sauvageau | B62D 55/12 |
| 2022/0219769 | A1 * | 7/2022 | Aubin-Marchand | B62D 55/04 |
| 2023/0069424 | A1 * | 3/2023 | Aubin-Marchand | B62D 55/15 |
| 2023/0294779 | A1 * | 9/2023 | Aubin-Marchand | B62D 55/04 305/132 |
| 2023/0331321 | A1 * | 10/2023 | Aubin-Marchand | B62D 55/15 |
| 2023/0365207 | A1 * | 11/2023 | Aubin-Marchand | B62D 55/104 |
| 2024/0375730 | A1 * | 11/2024 | Aubin-Marchand | B62D 55/1086 |

(Continued)

*Primary Examiner* — Jason R Bellinger
(74) *Attorney, Agent, or Firm* — BCF LLP

(57) ABSTRACT

A support structure, which is for a track system, includes a shaft, a wheel assembly and a deformable portion. The wheel assembly is connectable to the shaft, which has a shoulder at one end, such that a lateral side of the wheel assembly is engageable with the shoulder. The deformable portion is connected to one of the shaft and the wheel assembly, and is disposed, when the wheel assembly is connected to the shaft, between the lateral side of the wheel assembly and the shoulder. The deformable portion is configured to, when deformed, provide a seal between the shaft and the lateral side of the wheel assembly.

20 Claims, 9 Drawing Sheets

(56) References Cited

U.S. PATENT DOCUMENTS

| 2024/0425125 A1* | 12/2024 | Aubin-Marchand | .. B62D 55/15 |
| 2025/0242874 A1* | 7/2025 | Aubin-Marchand | .. B62D 55/15 |

* cited by examiner

SUPPORT STRUCTURE HAVING A SEAL FOR A TRACK ASSEMBLY AND SUPPORT STRUCTURE HAVING A GUIDE RAIL

CROSS-REFERENCE TO RELATED APPLICATION

The present application claims priority to U.S. Provisional Patent Application No. 63/347,100, filed May 31, 2022 entitled "Support Structure Having a Seal for a Track Assembly and Support Structure Having a Guide Rail", which is incorporated by reference herein in its entirety.

TECHNICAL FIELD

The present application generally relates to support structures for track assemblies, specifically support structures having seals and support structures having guide rails.

BACKGROUND

Certain vehicles, such as, for example, agricultural vehicles (e.g., harvesters, combines, tractors, etc.), construction vehicles (e.g., trucks, front-end loaders, etc.) and recreational vehicles (e.g., all-terrain vehicles, utility-terrain vehicles, side-by-side vehicles, etc.) are used on ground surfaces that are soft, slippery and/or uneven (e.g., soil, mud, sand, ice, snow, etc.).

Conventionally, such vehicles have had large wheels with tires on them to move the vehicle along the ground surface. Under certain conditions, such tires may have poor traction on some kinds of ground surfaces and, as these vehicles are generally heavy, the tires may compact the ground surface in an undesirable way owing to the weight of the vehicle. For example, when the vehicle is an agricultural vehicle, the tires may compact the soil in such a way as to undesirably inhibit the growth of crops. When the vehicle is a recreational vehicle, the tires may lack traction on certain terrain and in certain conditions.

In order to reduce the aforementioned drawbacks, to increase traction and to distribute the weight of the vehicle over a larger area on the ground surface, track systems were developed to be used in place of at least some of the wheels and tires on the vehicles. For example, under certain conditions, track systems enable vehicles to be used in wet field conditions as opposed to its wheeled counterpart. In other conditions, track systems enable recreational vehicles to be used in low traction terrains such as snowy roads.

Conventional track systems do, however, present some inconveniences. When used in wet field conditions or when washed, for example via pressure washers, various elements such as water, dirt and/or soap can infiltrate into wheel assemblies of the track systems, which can negatively impact life of said wheel assemblies. Notably, elements can infiltrate into the wheel assemblies by passing between the wheel assembly and the shaft to which it is connected and affect the overall performance of the wheel assembly as well as that of the track system.

Therefore, there is a desire for a support structure for a track system that could mitigate at least some of the above-mentioned issues.

SUMMARY

It is an object of the present technology to ameliorate at least some of the inconveniences present in the prior art.

According to one aspect of the present technology, there is provided a support structure for a track assembly. The support structure includes a shaft, a wheel assembly and a deformable portion. The shaft has a shoulder at one end. The wheel assembly is connectable to the shaft such that a lateral side of the wheel assembly is engageable with the shoulder. The deformable portion is connected to at least one of the shaft and the wheel assembly, and is disposed, when the wheel assembly is connected to the shaft, between the lateral side of the wheel assembly and the shoulder. The deformable portion is configured to, when deformed, provide a seal between the shaft and the lateral side of the wheel assembly.

In some embodiments, the shaft is made of a first material, and the deformable portion is made of a second material, the second material being more malleable than the first material.

In some embodiments, the second material is an elastomeric material.

In some embodiments, the deformable portion is molded to one of the shaft and the wheel assembly.

In some embodiments, the deformable portion is molded to the shaft and the deformable portion extends over the shoulder.

In some embodiments, the wheel assembly further includes an internal deformable portion connected to an internal side of the wheel assembly, the internal deformable portion being configured to, when deformed, provide a seal between the shaft and the internal side of the wheel assembly.

In some embodiments, the internal deformable portion is molded to the internal side of the wheel assembly.

In some embodiments, the wheel assembly includes a sealing cap on the lateral side of the wheel assembly.

In some embodiments, the wheel assembly includes a sealing cap disposed on the lateral side of the wheel assembly, and the deformable portion is connected to a lateral side of the sealing cap.

In some embodiments, the deformable portion is molded to the lateral side of the sealing cap.

In some embodiments, the wheel assembly further includes an internal deformable portion connected to an internal side of the sealing cap, the internal deformable portion being configured to, when deformed, provide a seal between the shaft and an internal side of the first wheel assembly.

In some embodiments, the internal deformable portion is molded to the internal side of the sealing cap.

In some embodiments, the deformable portion and the internal deformable portion are connected by a connecting deformable portion.

In some embodiments, in response to the connection of the wheel assembly to the shaft, the deformable portion undergoes resilient deformation.

In some embodiments, the resilient deformation is a compressive deformation.

In some embodiments, in response to the connection of the wheel assembly to the shaft, the deformable portion, when deformed, has a thickness of about 0.0025 millimetres.

In some embodiments, in response to the connection of the wheel assembly to the shaft, the deformable portion deforms to form a lip.

In some embodiments, the lip has a height of about three millimetres.

In some embodiments, the support structure further includes adhesive between the deformable portion and the shaft.

In some embodiments, the wheel assembly is connected to the shaft by a bearing.

In some embodiments, the wheel assembly is a tandem wheel assembly.

In some embodiments, the shoulder is a first shoulder, the wheel assembly is a first wheel assembly, and the deformable portion is a first deformable portion. The shaft has a second shoulder at another end. The support structure further includes a second wheel assembly connectable to the shaft such that a lateral side of the second wheel assembly is engageable with the second shoulder, and a second deformable portion connected to at least one of the shaft and the second wheel assembly, and being disposed, when the second wheel assembly is connected to the shaft, between the lateral side of the second wheel assembly and the second shoulder, and the deformable portion being configured to, when deformed, provide a seal between the shaft and the lateral side of the second wheel assembly.

In some embodiments, the second deformable portion is molded to one of the shaft and the second wheel assembly.

In some embodiments, the first and second deformable portions are separate from one another.

In some embodiments, the first and second deformable portions are interconnected by an intermediate deformable portion forming a continuous deformable layer.

In some embodiments, the intermediate deformable portion has a thickness of less than about one millimetre.

In some embodiments, the continuous deformable layer extends along a majority of the shaft.

In some embodiments, the support structure further includes a resilient member connectable to a frame of the track system, the deformable layer being an extension of the resilient member.

According to another aspect of the present technology, there is provided a support structure for a track system, the support structure including a shaft, first and second wheel assemblies and first and second deformable portions. The shaft has a first shoulder at a first end and a second shoulder at a second end. The first wheel assembly is connectable to the shaft at the first end such that a lateral side of the first wheel assembly is engageable with the first shoulder. The second wheel assembly is connectable to the shaft at the second end such that a lateral side of the second wheel assembly is engageable with the second shoulder. The first deformable portion is connected to the shaft and extends over the first shoulder, the first deformable portion being configured to, when deformed, provide a seal between the shaft and the lateral side of the first wheel assembly. The second deformable portion is connected to the shaft and extends over the second shoulder, the second deformable portion being configured to, when deformed, provide a seal between the shaft and the lateral side of the second wheel assembly.

In some embodiments, the first and second deformable portions are molded to the shaft.

In some embodiments, the first deformable portion is engageable by a lateral side of a sealing cap of the first wheel assembly, and the second deformable portion is engageable by a lateral side of a sealing cap of the second wheel assembly.

In some embodiments, the sealing cap of the first wheel assembly has an internal deformable portion on an internal side thereof, the internal deformable portion being configured to, when deformed, provide a seal between the shaft and an internal side of the first wheel assembly, and the sealing cap of the second wheel assembly has an internal deformable portion on an internal side thereof, the internal deformable portion being configured to, when deformed, provide a seal between the shaft and an internal side of the second wheel assembly.

According to another aspect of the present technology, there is provided a support structure for a track system, the support structure including a shaft and first and second deformable portions. The shaft has a first shoulder at a first end and a second shoulder at a second end. The first wheel assembly is connectable to the shaft at the first end, has a first sealing cap having a first deformable portion connected to a lateral side thereof, the lateral side of the first sealing cap being engageable with the first shoulder. The second wheel assembly is connectable to the shaft at the second end, has a second sealing cap having a second deformable portion connected to a lateral side thereof, the lateral side of the second sealing cap being engageable with the second shoulder. The first deformable portion is configured to, when deformed, provide a seal between the shaft and the first wheel assembly, and the second deformable portion is configured to, when deformed, provide a seal between the shaft and the second wheel assembly.

In some embodiments, the first deformable portion is molded on the lateral side of the first sealing cap, and the second deformable portion is molded on the lateral side of the second sealing cap.

In some embodiments, the first sealing cap includes a first internal deformable portion connected to an internal side of the first sealing cap, the first internal deformable portion being configured to, when deformed, provide a seal between the shaft and an internal side of the first wheel assembly, and the second sealing cap includes a second internal deformable portion connected to an internal side of the second sealing cap, the second internal deformable portion being configured to, when deformed, provide a seal between the shaft and an internal side of the second wheel assembly.

In some embodiments, the first internal deformable portion is molded to the internal side of the first sealing cap, and the second internal deformable portion is molded to the internal side of the second sealing cap.

In some embodiments, the first deformable portion and the first internal deformable portion are connected by a first interconnecting portion, and the second deformable portion and the second internal deformable portions are connected by a second interconnecting portion.

According to another aspect of the present technology, there is provided a support structure connectable to a frame of a track system. The support structure includes a resilient member, a shaft and a guiding member. The resilient member connectable to the frame. The shaft is fixedly connected to the resilient member, and is configured to connect with at least one wheel assembly. The guiding member is connected to the resilient member, and is engageable to an endless track of the track system to limit movement of the shaft. The resilient member biases the shaft and the guiding member toward a first position.

In some embodiments, a cross-section taken along a plane generally perpendicular to a longitudinal center plane of the support structure of the resilient member in the first position has an arcuate profile.

In some embodiments, a virtual center of the arcuate profile is vertically below the shaft.

In some embodiments, the resilient member has at least one connecting portion configured to connect with the guiding member.

In some embodiments, the resilient member has at least one reinforcing member therein.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example, "A and/or B" is to be taken as specific disclosure of each of (i) A, (ii) B and (iii) A and B, just as if each is set out individually herein.

For purposes of the present application, terms related to spatial orientation when referring to a track system and components in relation thereto, such as "vertical", "horizontal", "forwardly", "rearwardly", "left", "right", "above" and "below", are as they would be understood by a driver of a vehicle to which the track system is connected, in which the driver is sitting on the vehicle in an upright driving position, with the vehicle steered straight-ahead and being at rest on flat, level ground.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
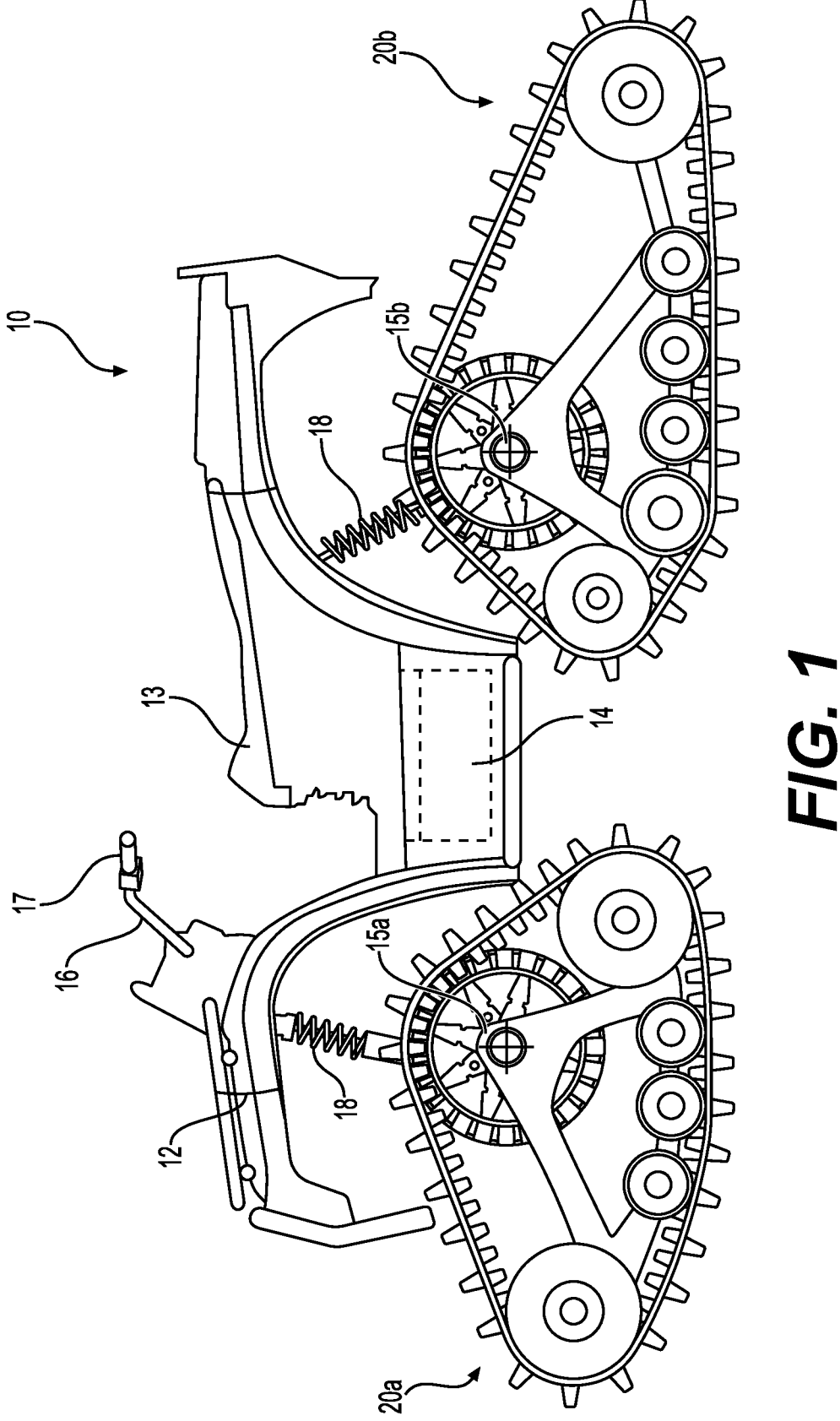
FIG. 1 is a left side elevation view of an all-terrain vehicle having track systems with support structures in accordance to an embodiment of the present technology.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

The present technology relates to a support structure that has a shaft with a shoulder, a wheel assembly connectable to the shaft and a deformable portion that is disposed between the shoulder and the wheel assembly. The deformable portion is configured to provide a seal between the shaft and the wheel assembly to prevent and/or limit infiltration of elements such as water and/or debris into the wheel assembly.
Off-Road Vehicle Referring to FIG. 1, the present technology will be described with reference to a vehicle 10. The vehicle 10 is an off-road vehicle 10. More precisely, the vehicle 10 is an all-terrain vehicle (ATV) 10. It is contemplated that in other embodiments, the vehicle 10 could be another type of recreational vehicle such as a snowmobile, a side-by-side vehicle or a utility-task vehicle (UTV).

A person skilled in the art will understand that it is also contemplated that some aspects of the present technology in whole or in part could be applied to other types of vehicles such as, for example, agricultural vehicles, industrial vehicles, military vehicles or exploratory vehicles.

The vehicle 10 has two front track systems 20a (only the left track system 20a is shown in the accompanying Figures) in accordance with embodiments of the present technology, and two rear track systems 20b (only the left track system 20b is shown in the accompanying Figures) also in accordance with embodiments of the present technology. In some embodiments, the vehicle 10 could have more or less than four track systems.

The vehicle 10 includes a frame 12, a straddle seat 13 disposed on the frame 12, a powertrain 14 (shown schematically), a steering system 16, a suspension system 18, and the track systems 20a, 20b.

The powertrain 14, which is supported by the frame 12, is configured to generate power and transmit said power to the track systems 20a, 20b via driving axles, thereby driving the vehicle 10. More precisely, the front track systems 20a are operatively connected to a front axle 15a of the vehicle 10 and, the rear track systems 20*b* are operatively connected to a rear axle 15*b* of the vehicle 10. It is contemplated that the powertrain 14 could be configured to provide its motive power to both the front and the rear axles 15*a*, 15*b*, to only the front axle 15*a* or to only the rear axle 15*b* (i.e., in some embodiments, the front axle and/or rear axle could be a driving axle).

The steering system 16 is configured to enable an operator of the vehicle 10 to steer the vehicle 10. To this end, the steering system 16 includes a handlebar 17 that is operable by the operator to direct the vehicle 10 along a desired course. In other embodiments, the handlebar 17 could be replaced by another steering device such as, for instance, a steering wheel. The steering system 16 is configured so that in response to the operator handling the handlebar 17, an orientation of the front track systems 20*a* relative to the frame 12 is changed, thereby enabling the vehicle 10 to turn in a desired direction.

The suspension system 18, which is connected between the frame 12 and the track systems 20*a*, 20*b* allows relative motion between the frame 12 and the track systems 20*a*, 20*b*, and can enhance handling of the vehicle 10 by absorbing shocks and assisting in maintaining adequate traction between the track systems 20*a*, 20*b* and the ground.

The track systems 20*a*, 20*b* are configured to compensate for and/or otherwise adapt to the suspension system 18 of the vehicle 10. For instance, the track systems 20*a*, 20*b* are configured to compensate for and/or otherwise adapt to alignment settings, namely camber (i.e., a camber angle, "roll"), caster (i.e., a caster angle, "steering angle" and/or toe (i.e., a toe angle, "yaw"), which are implemented by the suspension system 18. As the vehicle 10 could have been originally designed to use wheels instead of the track systems, the alignment settings could originally have been set to optimize travel, handling, ride quality, etc. of the vehicle 10 with the use of wheels. Since the track systems 20*a*, 20*b* are structurally different and behave differently from wheels, the track system 20*a*, 20*b* may be configured to compensate for and/or otherwise adapt to the alignment settings to enhance their traction and/or other aspects of their performances and/or use.

Track System

Figure 2:
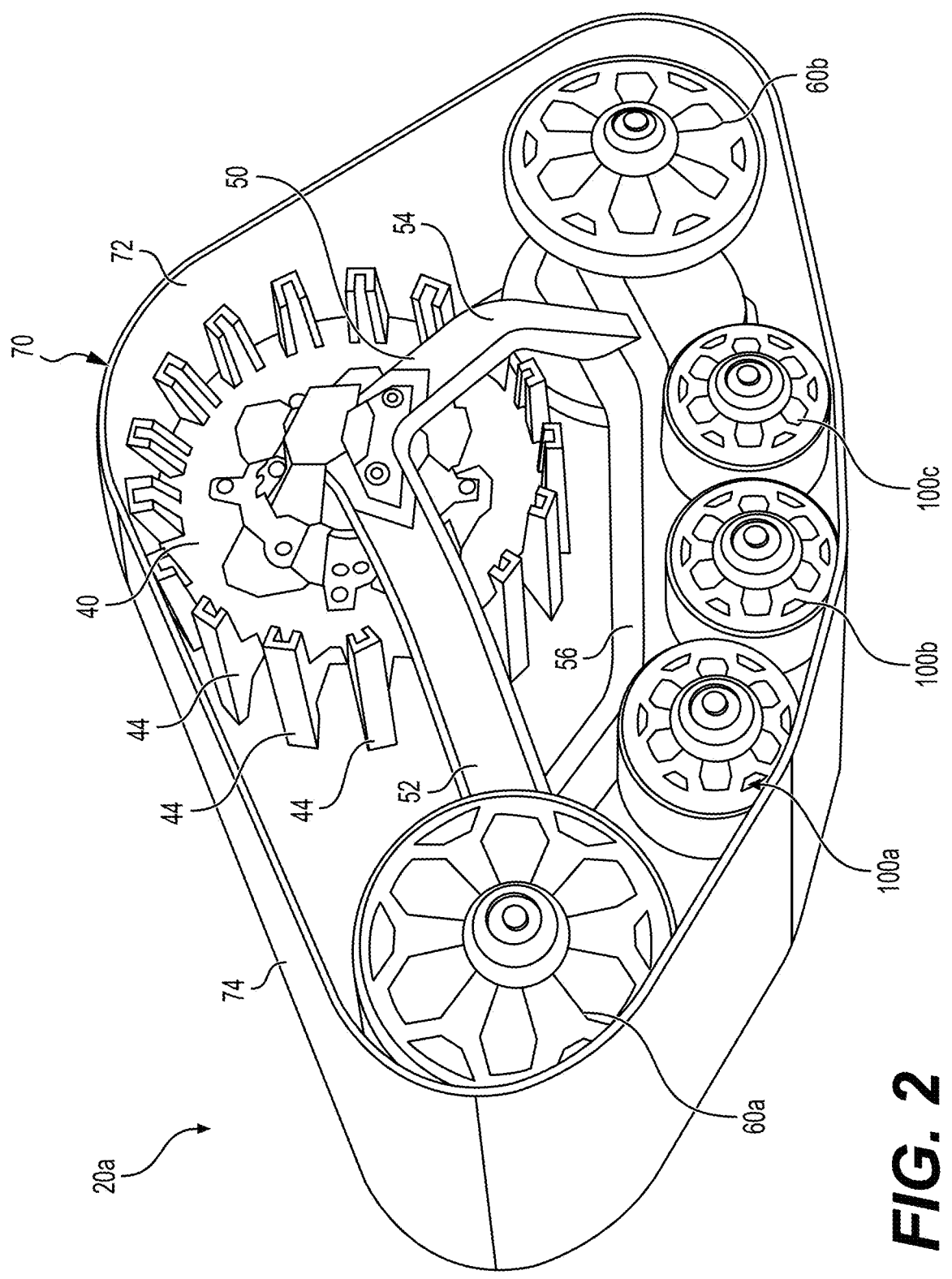
FIG. 2 is a perspective view taken from a bottom, front, left side of a front left track system of the all-terrain vehicle of FIG. 1.

Referring now to FIG. 2, the present technology will be described more specifically with reference to the front track systems 20*a*. It is understood, however, that the rear track systems 20*b* include support structures according to embodiments of the present technology.

The front track systems 20*a* include left and right track systems which are similar to one another. Specifically, the left and right track systems are generally symmetrical about a longitudinal center plane of the vehicle 10. For this reason, only the left track system 20*a* (which is shown in the accompanying Figures) will be described herewith.

The track system 20*a* includes a sprocket wheel assembly 40 which is operatively connectable to the driving axle 15*a*. The driving axle 15*a* can drive the sprocket wheel assembly 40, which can, in turn drive the track system 20*a*. The sprocket wheel assembly 40 defines laterally extending engaging members 44 (i.e., teeth) disposed on the circumference of the sprocket wheel assembly 40. The engaging members 44 are adapted, as will be described in greater detail below, to engage with lugs 76 provided on an inner surface 72 of an endless track 70 of the track system 20*a*. It is contemplated that in other embodiments, the configuration of the sprocket wheel assembly 40 could differ without departing from the scope of the present technology.

8

Figure 3:
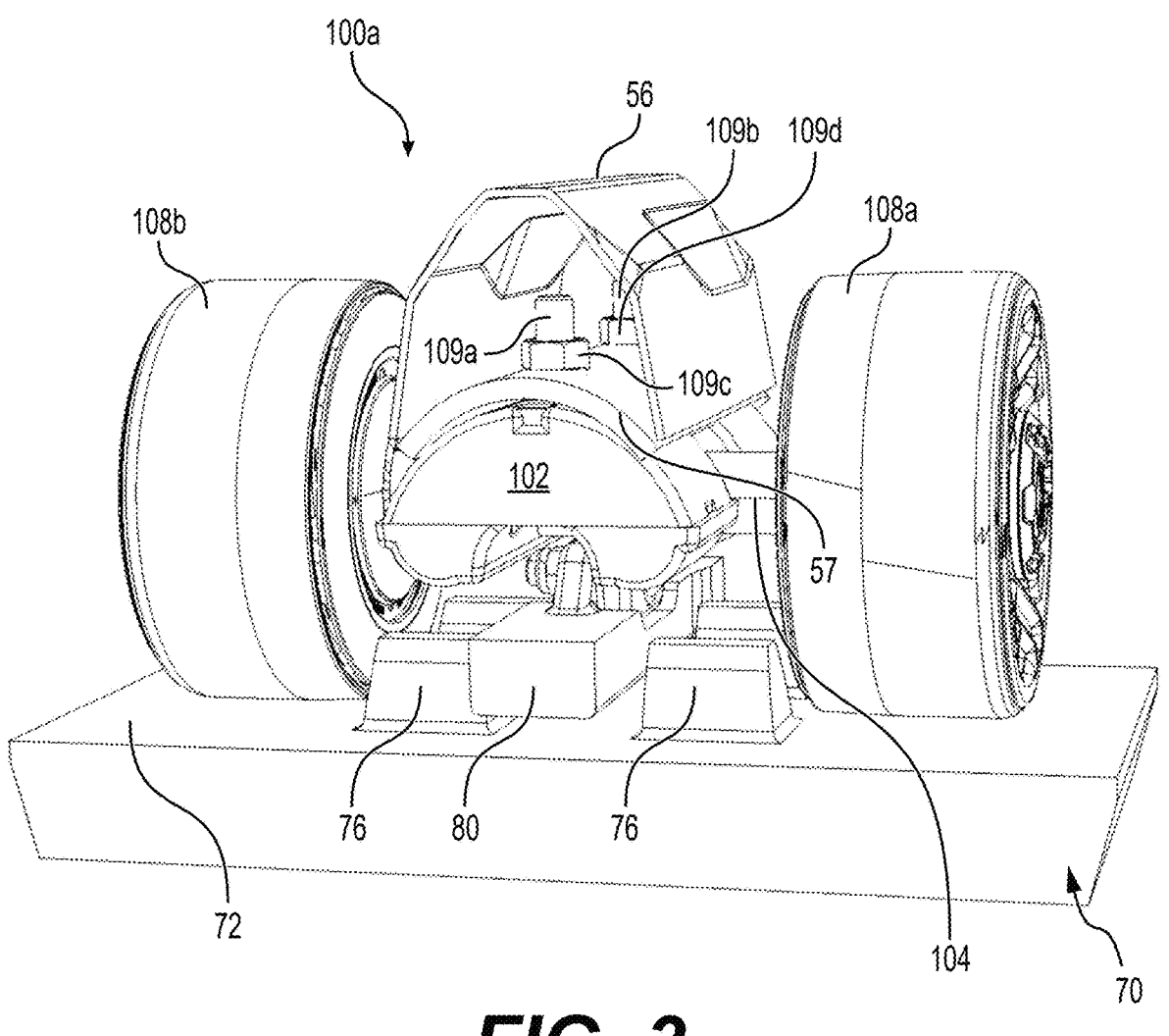
FIG. 3 is a perspective view taken from a front, top, left side of a portion of the track system of FIG. 2.

The track system 20*a* further includes a frame 50. The frame 50 includes a leading frame member 52, a trailing frame member 54 and a lower frame member 56. The leading and trailing frame members 52, 54 are jointly connected around the driving axle 15*a*, the joint connection being positioned laterally outwardly from the sprocket wheel assembly 40. The leading frame member 52 extends forwardly and downwardly from the joint connection and connects to a forward portion of the lower frame member 56. The trailing frame member 54 extends rearwardly and downwardly from the joint connection and connects to a rearward portion of the lower frame member 56. The lower frame member 56, which is positioned below the joint connection, extends generally parallel to the forward direction of travel of the vehicle, and has an arcuate bottom section 57 (shown in FIG. 3). In the present embodiment, the leading, trailing and lower frame members 52, 54, 56 are integral. It is contemplated that in other embodiments, the leading, trailing and lower frame members 52, 54, 56 could be distinct members connected to one another. It is further contemplated that in some embodiments, the frame 50 could include more or less than three members. In some embodiments, one or more of the leading, trailing and lower frame members 52, 54, 56 could be pivotally connected to one another.

With continued reference to FIG. 2, the track system 20*a* further includes a leading idler wheel assembly 60*a*, a trailing idler wheel assembly 60*b*, and three support structures 100*a*, 100*b*, 100*c*. Each of the leading and trailing idler wheel assemblies 60*a*, 60*b* and the support structures 100*a*, 100*b*, 100*c* includes two laterally spaced wheels.

The leading idler wheel assembly 60*a* is rotationally connected to a leading end of the lower frame member 56, the trailing idler wheel assembly 60*b* is rotationally connected to a trailing end of the lower frame member 56, and the support structures 100*a*, 100*b*, 100*c* which will be described in greater detail below, are connected to the lower frame member 56 longitudinally between the leading and trailing idler wheel assemblies 60*a*, 60*b*.

In some embodiments, at least one of the leading and trailing idler wheel assemblies 60*a*, 60*b* could be connected to the lower frame member 56 via a tensioner (not shown), where the tensioner is operable to adjust the tension in the endless track 70 by selectively moving the at least one of the leading and trailing idler wheel assemblies 60*a*, 60*b* toward or away from the frame 50.

The track system 20*a* also includes the endless track 70, which extends around components of the track system 20*a*, notably the frame 50, the leading and trailing idler wheel assemblies 60*a*, 60*b* and the support structures 100*a*, 100*b*, 100*c*. The endless track 70 has the inner surface 72 and an outer surface 74. The inner surface 72 of endless track 70 has the left and right sets of lugs 76 (shown in FIG. 3). The left and right sets of lugs 76 are adapted to engage with the engaging members 44 of the sprocket wheel assembly 40. It is contemplated that in some embodiments, there could be only one set of lugs 76. The outer surface 74 of the endless track 70 has a tread (not shown) defined thereon. It is contemplated that the tread could vary from one embodiment to another. In some embodiments, the tread could depend on the type of vehicle 10 on which the track system 20*a* is to be used and/or the type of ground surface on which the vehicle 10 is destined to travel. In the present embodiment, the endless track 70 is an elastomeric endless track. Specifically, the endless track 70 is a polymeric endless track. It is contemplated that the endless track 70 could have reinforcing members disposed therein.

Figure 4:
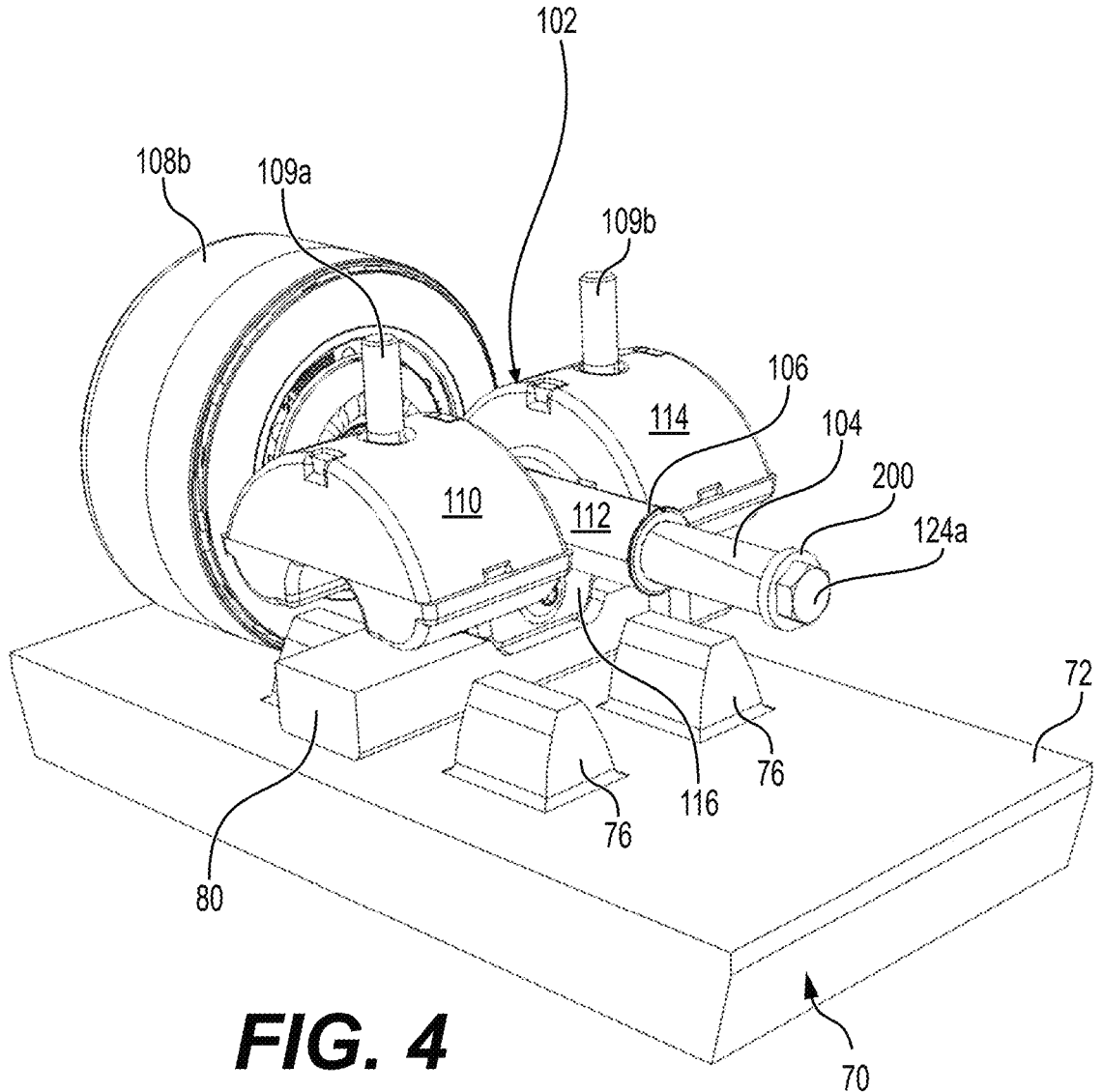
FIG. 4 is a perspective view taken from a front, top, left side of the portion of the track system of FIG. 3, with a wheel assembly being omitted.

The track system 20*a* also includes a guide rail 80 (shown in FIGS. 3 and 4) for limiting deformation of and guiding the endless track 70. The guide rail 80 is connected to the support structures 100*a*, 100*b*, 100*c* and is disposed between the left and right sets of lugs 76. The guide rail 80 is connected to the support structures 100, 100*b*, 100*c* such that, in an initial position, the guide rail 80 is vertically spaced from the endless track 70. More precisely, in the initial position, a lower surface of the guide rail 80 is vertically spaced from the inner surface 72 of the endless track 70. The guide rail 80 is resiliently deformable. The guide rail 80 can be deformed vertically, horizontally and/or torsionally. In some embodiments, the guide rail 80 is configured to deform similarly in terms of orientation to the endless track 70. In some embodiments, the guide rail 80 is made from a material with a low coefficient of friction, such as ultra-high molecular weight polyethylene (UHMW-PE) so that when the guide rail 80 engages the inner surface 72 of the endless track 70, friction therebetween is not so high as to significantly impact on rolling of the endless track 70. In some embodiments, the guide rail 80 can be omitted.

Support Structure

Referring to FIGS. 3, 4, 5A, 5B, 5C, 6A and 6B, the support structures 100*a*, 100*b*, 100*c* will now be described in greater detail. Since the support structures 100*a*, 100*b*, 100*c* are all similar, only the support structure 100*a* will be described in detail herewith. It is to be noted that the front and rear idler wheel assemblies 60*a*, 60*b* may also have some of the features of the support structure 100*a*.

The support structure 100*a* includes a resilient member 102, a shaft 104 connected to the resilient member 102, a deformable portion 106 extending along the shaft 104, and left and right wheel assemblies 108*a*, 108*b* that are each rotationally connected to shaft 104. In some embodiments, as will be described below, the resilient member 102 could be omitted. In other embodiments, the support structure 100*a* could only include one wheel assembly connected thereto. In other embodiments, the support structure 100*a* could include, on one lateral side thereof, two wheel assemblies configured as a tandem assembly connected thereto, as will further be described.

In the present embodiment, the support structure 100*a* is connected to the lower frame member 56 by the resilient member 102, which will now be described in greater detail.

The resilient member 102 includes a front section 110, a central section 112 and a rear section 114. The front and rear sections 110, 114 are similar to one another, and the central section 112 extends therebetween. As will be described in greater detail below, the central section 112 is configured to connect with the shaft 104, such that when the shaft 104 is connected with the central section 112, the front section 110 is longitudinally forward from the shaft 104, and the rear section 114 is longitudinally rearward from the shaft 104.

Profiles of the front and rear sections 110, 114 taken along a cross-sectional plane extending generally perpendicularly to a longitudinal center plane 52 of the support structure 100, are generally arcuate. Virtual centers VC of the arcuate profiles of the front and rear sections 110, 114, when the support structure 100*a* is in a resting position (shown in FIG. 5A) are vertically below the shaft 104 and thus closer to the inner surface 72 of the endless track 70. The virtual centers VC, while also corresponding to a center of the arcuate profile, correspond to a reference about which the shaft 104 pivots (being that the shaft 104 is connected to the resilient member 102). The virtual centers VC being below the shaft 104 can assist in reducing lateral movement of the support wheel assemblies 108*a*, 108*b*, and thus can reduce risks of the support wheel assemblies contacting the lugs 76, when the resilient member 102 deforms and the shaft 104 generally pivots about the virtual centers VC (usually in response to the track system 20*a* encountering an obstacle). It is contemplated that in some embodiments, the front and rear sections 110, 114 of the resilient member 102 could each include reinforcing members therein for limiting the extent of the front and rear sections 110, 114 can deform. It is to be noted that a top of the front and rear sections 110, 114 is complementary to the arcuate bottom section 57 of the lower frame member 56, which can assist in reducing slippage of the resilient member 102 relative to the lower frame member 56.

As mentioned above, the support structure 100*a* is connected to the lower frame member 56 by the resilient member 102. More specifically, the resilient member 102 is connected to the lower frame member 56 via bolts 109*a*, 109*b* that extend through, respectively, the front and rear sections 110, 114 of the resilient member 102. The bolts 109*a*, 109*b* are respectively connected to nuts 109*c*, 109*d* disposed within the lower frame member 56. Thus, the resilient member 102 is removably connected to the lower frame member 56. It is contemplated that in other embodiments, the resilient member 102 could be connected to the lower frame member 56 differently. For example, other types of fasteners such as rivets could be used, or the resilient member 102 could be connected to the lower frame member 56 via an adhesive. In some embodiments, an adhesive could be used in addition to using fasteners. The use of an adhesive could assist in reducing slippage of the resilient member 102 relative to the lower frame member 56.

Referring particularly to FIGS. 5A to 5C, 6A and 6B, the central section 112 is connected to the shaft 104. In some instances, the central section 112 is removably connected to the shaft 104. In the present embodiment, the central section 112 includes the deformable portion 106 such that the deformable portion 106 is an extension of the resilient member 102. The deformable portion 106 will be described in greater detail below. The central section 112 also includes a connecting portion 116 that extends downwardly on a lateral side of a longitudinal center plane 52 of the support structure 100*a*, and that is for connecting with the guide rail 80. It is contemplated that in some embodiments, there could be two connecting portions extending on either lateral side of the longitudinal center plane 52. While the connecting portion 116 generally made of a resilient material, the connecting portion 116 includes a reinforcing member 117 therein for reinforcing the connecting portion 116 (i.e., for limiting the extent of deformability of the connecting portion 116). In some embodiments, the reinforcing member 117 could be omitted.

The connecting portion 116 defines an aperture configured to receive a fastener 118 therein. The fastener 118 can be fastened with a bolt nut 119 for connecting the guide rail 80 to the resilient member 102. It is contemplated that in some embodiments, the resilient member 102 and the guide rail 80 could be connected differently. For example, the resilient member 102 and guide rail 80 could be connected via an adhesive or via molding. The connecting portion 116 is deformable, and as such, the guide rail 80 is moveable from its initial position (shown in FIG. 5A).

The resilient member 102 is resiliently deformable, and could be made of a resilient member such as an elastomer like rubber. The resilient nature of the resilient member 102 enables the support structure 100*a* to be moveable or displaceable from its initial position (shown in FIG. 5A) to an offset position (e.g., shaft being pivoted about the virtual center VC). When the support structure 100a is offset from the initial position, the resilient member 102 biases the support structure 100a back toward the initial position. In other words, the resilient member 102 enables movement of the shaft 104, and therefore enables movement of the wheel assemblies 108a, 108b.

For example, in response to the track system 20a encountering an obstacle such as a ditch or a rock that is laterally aligned with one of the wheel assemblies 108a, 108b, one of the wheel assemblies 108a, 108b that encounters the obstacle moves vertically to accommodate for the obstacle. As a result, the shaft 104 moves accordingly, and the resilient member 102 is deformed. Once the one of the wheel assemblies 108a, 108b is offset from the initial position, the resilient member 102 biases it back toward the initial position, which can assist in overcoming said obstacle.

Deformation of the endless track 70 can be limited by the guide rail 80. For example, if the track system 20a encounters an obstacle such as a rock that is generally laterally centered relative to the track system 20a, the endless track 70 begins to deform to conform to the obstacle. In some instances where the rock would be large enough, the endless track 70 would deform until the inner surface 72 thereof comes into contact with the guide rail 80. Thus, the guide rail 80 can prevent damage to the endless track 70 by limiting the extent by which the endless track 70 can deform.

Furthermore, the endless track 70 can also be guided by the guide rail 80. Indeed, as mentioned above, the guide rail 80 is disposed between the left and right sets of lugs 76, and as such can abut with the left and right sets of lugs 76. As such, the guide rail 80 can prevent de-tracking of the endless track 70 from the track system 20a.

It is to be noted that according to some implementations of the present technology, the resilient member 102 could be omitted from the support structure 100a. In such embodiments, the shaft 104 could be, for example, directly connected to the lower frame member 56, such that the shaft 104 would not be pivotable. In such embodiments, the deformable portion 106 would still be present and would be extending on the shaft 104.

The central section 112 is connected to the shaft 104. The central section 112 is molded around the shaft 104. It is contemplated that in other embodiments, the central section 112 and the shaft 104 could be connected differently. It is contemplated that in other embodiments, the shaft 104 could be received in an aperture defined in the central section 112.

The shaft 104 has a shaft shoulder 120a at one end thereof, and a shaft shoulder 120b at the other end thereof. The shaft shoulders 120a, 120b, which are present on a circumference of the shaft 104. It is to be noted that the radius of the shaft 104 reduces beyond the shaft shoulders 120a, 120b. However, it is contemplated that in other embodiments, the shaft shoulders 120a, 120b could have other shapes. The shaft 104 also defines end apertures 122a, 122b for, respectively receiving end fasteners 124a, 124b therein. The end fasteners 124a, 124b will be described in greater detail below. The shaft 104 is made of steel, which enables it to sustain high loads. It is contemplated that in other embodiments, the shaft 104 could be made of other material such as aluminum.

With continued reference to FIGS. 5A, 5B, 5C, 6A and 6B, the deformable portion 106 which is configured to provide a seal between the shaft 104 and the wheel assemblies 108a, 108b will now be described in greater detail.

In the present embodiment, the deformable portion 106 extends along a majority of the shaft 104. Specifically, the deformable portion 106 extends over the shaft shoulders 120a, 120b. In other words, at least a portion of the deformable portion 106 is disposed between the shaft shoulder 120a and the wheel assembly 108a, and at least a portion of the deformable portion 106 is disposed between the shaft shoulder 120b and the respective wheel assemblies 108b. In some embodiments, the amount by which the deformable portion 106 extends beyond the shaft shoulders 120a, 120b could depend on the mechanical properties of the deformable portion 106 such as resiliency, malleability and/or modulus of elasticity (i.e., the extent of deformability of the deformable portion 106). In some instances, the deformable portion 106 extends beyond the respective shaft shoulders 120a, 120b by about 0.002 inches. It is contemplated that in other embodiments, the deformable portion 106 could extend beyond the respective shaft shoulders 120a, 120b by more or less than 0.002 inches. Furthermore, a radial thickness of the deformable portion 106 is generally uniform along a length of the shaft 104. In some instances where the deformable portion 106 is molded to the shaft 104, the thickness of the deformable portion 106 could be limited by the mold used to mold the deformable portion 106 to the shaft 104. In some instances, an adhesive could be provided between the deformable portion 106 and the shaft 104.

As mentioned above, the deformable portion 106 is an extension of the resilient member 102. More precisely, the deformable portion 106 extends from the central section 112 of the resilient member 102. However, it is contemplated that in some embodiments, the deformable portion 106 could be distinct from the resilient member 102 and not be connected to the resilient member 102.

In some embodiments where the resilient member 102 is omitted, the deformable portion 106 could be a continuous layer surrounding the shaft 104 and extending along the shaft 104 beyond the shaft shoulders 120a, 120b.

It is contemplated that in other embodiments, there could be two separate deformable portions 106: one deformable portion extending over the shaft shoulder 120a, and another deformable portion extending over the shaft shoulder 120b.

Furthermore, as will be described below, it is contemplated that in some embodiments, the deformable portion 106 could be connected to the support wheel assemblies 108a, 108b instead of, or in addition to, the shaft 104.

As will also be described in greater detail below, the deformable portion 106 is configured to, upon deformation, provide a seal between the shaft 104 and the wheel assemblies 108a, 108b. Upon deformation, shown in FIGS. 5A, 5B and 5C, the deformable portion 106 forms a lip 130a over the shaft shoulder 120a, and a lip 130b over the shaft shoulder 120b. The lips 130a, 130b, which contribute to providing a seal between the shaft 104 and the wheel assemblies 108a, 108b, will also be described in greater detail below.

In the present embodiment, the deformable portion 106 is made of resiliently deformable material. The resiliently deformable material could be an elastomer like rubber, such that the deformable portion 106 could be an elastomeric portion. It is contemplated that in other embodiments, the deformable portion 106 could be a non-resilient material that is different from the material of the shaft 104, and that is sufficiently deformable (malleable) to be deformed to provide the seal between the shaft 104 and the wheel assemblies 108a, 108b. For example, the deformable portion 106 could be made of, for example, aluminum or brass.

Figure 5A:
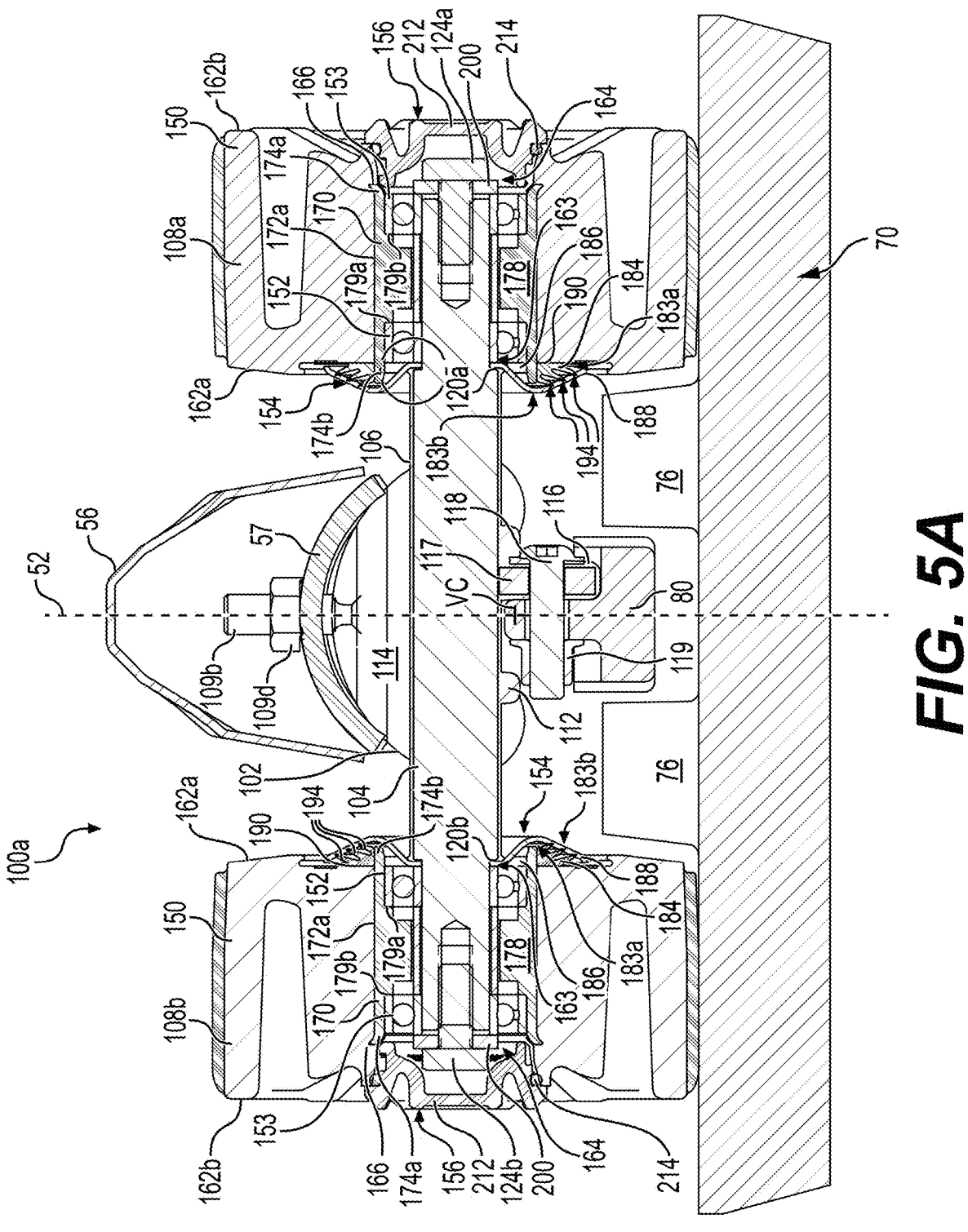
FIG. 5A is a cross-sectional view of the portion of the track system of FIG. 2 taken laterally along a longitudinal center of the support structure.
Figures 5B, 5C:
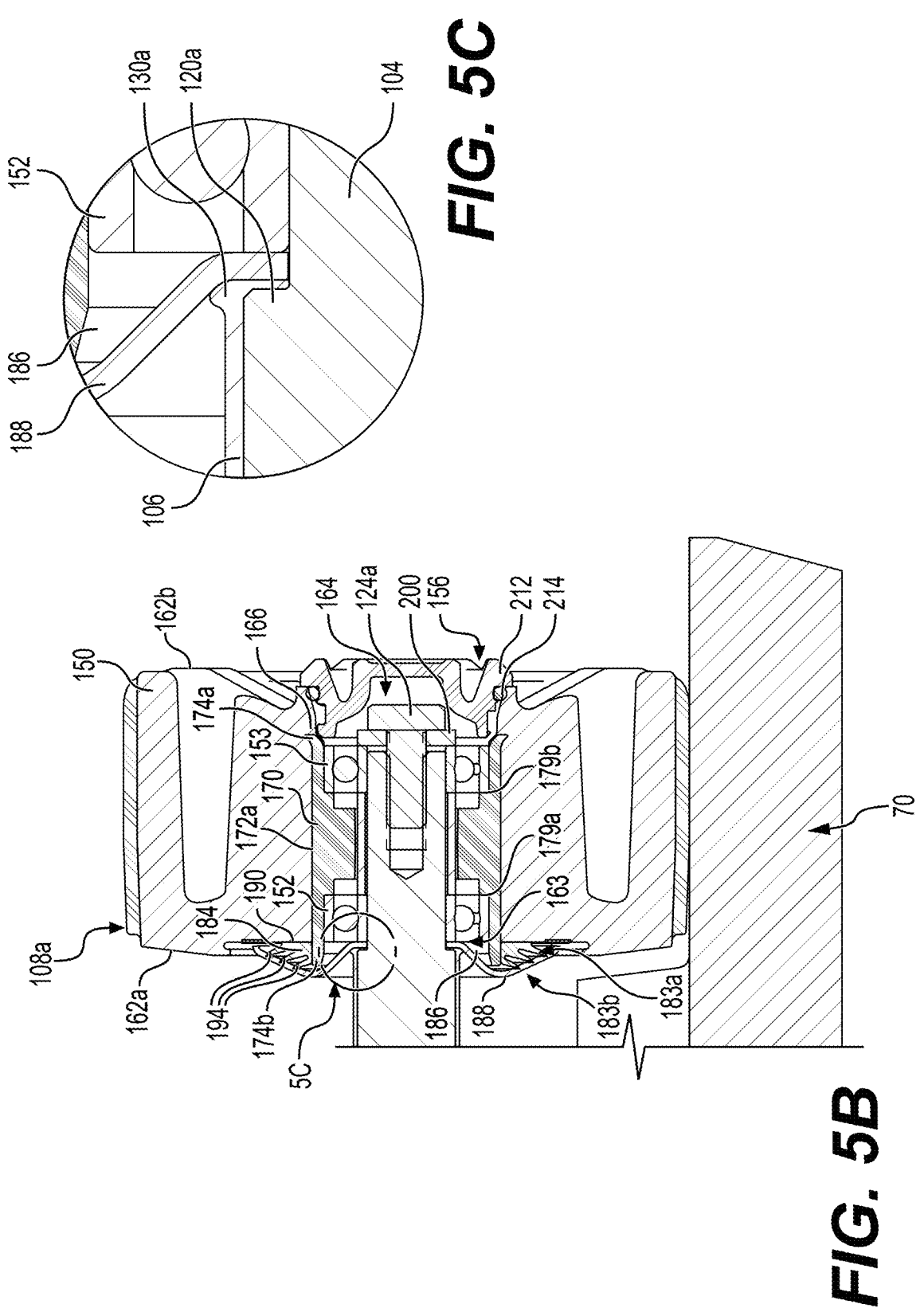
FIG. 5B is a close-up of a wheel assembly of FIG. 5A.
FIG. 5C is a close-up of a seal of FIG. 5B.
Figures 6A, 6B:
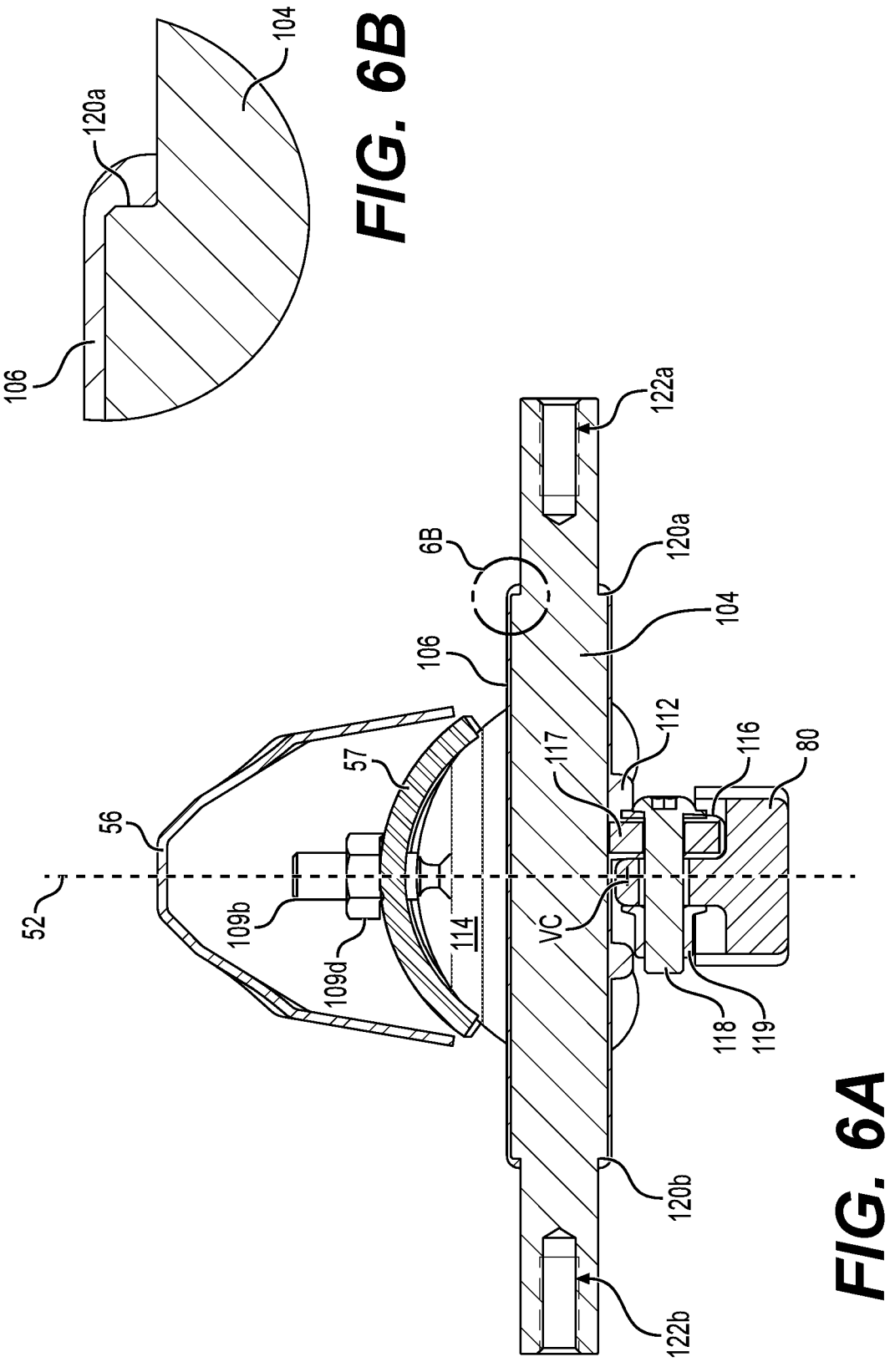
FIG. 6A is a cross-sectional view of the support structure of FIG. 3 with the wheel assemblies being omitted, the support structure being connected to a guide rail and to a lower frame member.
FIG. 6B is a close-up of a deformable portion and shaft of FIG. 6A.

With reference to FIG. 5B, the left and right support wheel assemblies 108a, 108b will now be described in greater detail. The left and right support wheel assemblies 108a, 108b are generally similar to one another. Specifically, the left and right wheel assemblies 108a, 108b are generally symmetrical about the longitudinal center plane 52. As such, only the left wheel assembly 108a will be described herewith.

The support wheel assembly 108a includes a wheel 150 having a sleeve 170, two bearings 152, 153, a seal assembly 154 and a cover assembly 156. It is contemplated that in other embodiments, the support wheel assembly 108a could have more or less components. For example, in some embodiments, the wheel 150 could include two or more support wheels, such that the support wheel assembly 108a would be a tandem wheel assembly. As other examples, there could be more or less than two bearings 152, 153 and/or the sleeve 170 could be omitted.

The wheel 150 is rotationally connected to the shaft 104 by the bearings 152, 153. It is contemplated that in some embodiments, the bearings 152, 153 could be omitted, and that the wheel 150 could be rotationally connected to the shaft 104 differently, for example via lubricant. The wheel 150 has an inward lateral side 162a that is oriented toward the longitudinal center plane 52, and an outward lateral side 162b that is oriented away from the longitudinal center plane 52. The wheel 150 defines a hub aperture 164 that extends therethrough (i.e., from the inward lateral side 162a to the outward lateral side 162b). The hub aperture 164, as will become apparent from the following description, is sized to receive a portion of the shaft 104 therein.

As mentioned above, the wheel 150 includes the sleeve 170, which is described in United Stated Patent Publication No. 2022/0219769 A1, published on Jul. 14, 2022, entitled "Multi-Feature Track System with Enhanced Performance", the content of which is incorporated herein by reference in its entirety. The sleeve 170, is generally tubular and is received in the hub aperture 164. In the present embodiment, an outer surface 172a of the sleeve 170 is fixedly connected to an inner radial surface of the wheel 150 by an adhesive. In other embodiments, the sleeve 170 and the wheel 150 could be connected differently. For example, in some embodiments, the wheel 150 could be molded around the sleeve 170. The sleeve 170 has a curved end 174a that abuts a shoulder 166 of the wheel 150. In some embodiments, the curved end 174a can assist in positioning the sleeve 170 in the hub aperture 164 (i.e., positioning the sleeve 170 relative to the wheel 150). In some embodiments, the curved end 174a could be linear. The sleeve 170 also has a projecting end 174b that is opposite to the curved end 174a, and that projects outwardly from the inward lateral side 162a of the hub aperture 164. The sleeve 170 has a radially extending central abutting portion 178. The central abutting portion 178 has side shoulders 179a, 179b that are configured to abut with, respectively, the bearings 152, 153 for positioning said bearings 152, 153 relative to the wheel 150. It is understood that the configuration of the sleeve 170 could vary from one embodiment to another. For instance, in some embodiments, the central abutting portion 178 could be omitted. The sleeve 170 can assist in distributing stress transmitted by the bearings 152, 153 from the shaft 104 to the wheel assembly 150 across a larger area, which can extend life of the wheel 150. In some embodiments, the sleeve 170 could be omitted.

The wheel assembly 108a also includes, as mentioned above, the bearings 152, 153. The bearings 152, 153 are configured to connect to the shaft 104 and to the wheel 150. More precisely, the bearings 152, 153 are configured to be received in the sleeve 170. In some embodiments, there could be an interference fit (e.g., press-fit) between the bearings 152, 153 and the sleeve 170. When the bearings

152, 153 are received in the sleeve 170, the bearings 152, 153 respectively abut side shoulders 179a, 179b of the central abutting portion 178 upon reaching pre-determined positions. Thus, the central abutting portion 178 can assist in positioning the bearings 152, 153 within the sleeve 170.

The wheel assembly 108a also includes a stopper 200 and the end fastener 124a. The stopper 200 is connectable to the shaft 104 via the end fastener 124a. The stopper 200 is sized to have a diameter that is larger than the shaft 104 so as to abut the bearing 154b, but that is smaller than the hub aperture 164 so as to fit therein. Thus, when the stopper 200 is connected to the shaft 104, movement of the bearing 153 away from the longitudinal center plane 52 is limited by the stopper 200. Due to the configuration of the shaft 104, the wheel 150, the sleeve 170 and the bearings 152, 153 the stopper 200 is configured to keep the wheel 150, the sleeve 170 and the bearings 152, 153 generally laterally fixed relative to the shaft 104.

With continued reference to FIG. 5B, the seal assembly 154 will now be described in greater detail. The seal assembly 154 is also described in United Stated Patent Publication No. 2022/0219769 A1, the content of which, as mentioned above, is incorporated herein by reference in its entirety. The seal assembly 154 includes a face seal 184, a bearing seal 186 and a sealing cap 188. The seal assembly 154 is positioned on the inward lateral side 162a of the wheel 150 when the wheel assembly 108a is connected to the shaft 104. The seal assembly 154 defines an internal side 163 of the wheel 150, in which the bearings 152, 153 are disposed.

The face seal 184 is configured to engage with the wheel 150 and with the sealing cap 188 for, when deformed, providing a seal between the inward lateral side 162a of the wheel 150 and the sealing cap 188. The face seal 184 is annular (i.e., defines a central aperture), and is configured to receive a portion of the sleeve 170 therein. Specifically, the face seal 184 tightly surrounds the projecting end 174b of the sleeve 170. In some embodiments, the face seal 184 could not surround a sleeve of the wheel 150. The face seal 184 has a generally flat surface 190 on one side thereof, and lips 194 on the other side thereof. Although, the face seal 184 has three lips 194 in this embodiment, it is contemplated that in other embodiments, the face seal 184 could have one, two or four or more lips. It is to be noted that having two or more lips 194 typically provide a better barrier against dust, water and debris than a single lip. The face seal 184 is made of an elastomeric material such as rubber. As will be described below, and as shown in FIGS. 5A, 5B and 5C, when the seal assembly 154 is connected to the wheel 150, the face seal 184 is resiliently deformed, and thereby provides the seal between the wheel 150 and the sealing cap 188.

The bearing seal 186 is configured to engage with the bearing 152 and with the sealing cap 188 for providing a seal between the bearing 152 and the sealing cap 188. The bearing seal 186 is annular (i.e., defines a central aperture), and is configured to receive a portion of the shaft 104 therein. Furthermore, the bearing seal 186 is sized to be surrounded by the sleeve 170, specifically by the projecting end 174a thereof. The bearing seal 186 is made of an elastomeric material such as rubber. As will be described below, when the seal assembly 154 is connected to the wheel 150, the bearing seal 186 is resiliently deformed, and thereby provides the seal between the bearing 152 and the sealing cap 188.

An internal side 183a of the sealing cap 188 is configured to engage with the face seal 184, with the bearing seal 186 and with the wheel 150, whereas a lateral side 183*b* of the sealing cap 188 is configured to engage with the shaft shoulder 120*a*. The sealing cap 188, which is annular (i.e., defines a central aperture), is sized to receive a portion of the shaft 104 therein, while, as mentioned above, also being sized to abut against the shoulder 120*b*. In some embodiments, the sealing cap 188 tightly surrounds the portion of the shaft 104 that is received therein. In some embodiments, there could be an interference fit (e.g., press-fit) between the sealing cap 188 and the shaft 104, which could assist in reducing entry of elements such as water and/or debris into the hub aperture 164. Other fits between the sealing cap 188 and the shaft 104 are contemplated. The internal side 183*a* of the sealing cap 188 has a concave profile so as to provide clearance to receive part of the face seal 184, part of the bearing seal 186 and part of the projecting end 174. The lateral side 183*b* has a convex profile to assist in reducing accumulation of substances thereon. In other words, the shape of the sealing cap 188 has been configured to facilitate dripping therefrom.

In some embodiments, the deformable portion 106 could form part of the seal assembly 154 and act as a sealing element between the shaft 104 and the wheel 150.

Connection of the wheel assembly 108*a* to the axle 104 causes i) resilient deformation of the face seal 184 between the wheel 150 and the sealing cap 188, thereby forming a seal therebetween, ii) resilient deformation of the bearing seal 186 between the bearing 152 and the sealing cap 188, thereby forming a seal therebetween, and iii) resilient deformation of the deformable portion 106 between the shaft shoulder 120*a* and the lateral side 183*b* of the sealing cap 188, thereby forming a seal therebetween.

With reference to FIGS. 5A and 5B, description of the cover assembly 156, which is also described in United Stated Patent Publication No. 2022/0219769 A1, the content of which, as mentioned above, is incorporated herein by reference in its entirety, will now be provided.

The cover assembly 156 is disposed on the outward lateral side 162*b*, and is configured to protect the components (e.g., bearings 152, 153) disposed in the hub aperture 164 from various elements such as water and/or debris. The cover assembly 156 includes an outer cap 212 and a sealing member 214. It is contemplated that in some embodiments, the protective cover assembly 156 could include additional members such as retaining members.

The outer cap 212 is sized and configured to be at least partially received in the hub aperture 164, and to cover said hub aperture 164 from the outward lateral side 162*b* of the wheel 150. In the present embodiment, the outer cap 212 is configured to connect to the wheel 150 via a snap-fit configuration. Other connections therebetween are contemplated.

The sealing member 214 is also sized and configured to be received in the hub aperture 164 between the wheel 150 and the outer cap 212. Specifically, the sealing member 214 is configured to surround a portion of the outer cap 212. The sealing member 214 is made of a resilient material such as rubber. When the sealing member 214 is connected to the outer cap 212, and the outer cap 212 is connected to the wheel 150, the sealing member 214 is resiliently deformed, thereby providing a seal between the wheel 150 and the outer cap 212. This seal can further prevent elements such as water and/or debris from being received in the hub aperture 164.

With continued reference to FIGS. 5A, 5B and 5C, a description of the wheel assembly 108*a* being connected to the shaft 104 will now be provided. It is understood that the wheel assembly 108*b* connects to the shaft 104 in a similar manner. For the purposes of this description, the wheel assembly 108*a* has already been assembled (i.e., the bearings 152, 153 are disposed in the hub aperture 164, the seal assembly 154 is connected to the wheel 150). It is to be noted that when the seal assembly 154 is connected to the wheel 150, the face seal 184 engages the wheel 150 and the internal side 183*a* of the sealing cap 188, and the bearing seal 186 engages the bearing 152 and the internal side 183*a* of the sealing cap 188. The face seal 184 is compressed, such that the face seal 184 is in sealing engagement with the wheel 150 and the sealing cap 188. The bearing seal 186 is compressed, such that the bearing seal 186 is in sealing engagement with the bearing 152 and the sealing cap 188. Thus, the face seal 184 and the bearing seal 186 can assist in preventing and/or reducing elements such as water and/or debris from entering into the hub aperture 164 from the inward lateral side 162*a* of the wheel.

The wheel assembly 108*a* is connected to the shaft 104 by receiving a portion of the shaft 104 through the seal assembly 154, the bearings 152, 153 and the hub aperture 164. The shaft 104 is partially received through the wheel assembly 108 until the sealing cap 188 abuts the shaft shoulder 120*a*, specifically, the lateral side 183*b* operationally engages the shaft shoulder 120*a* and deforms the deformable portion 106 extending beyond the shaft shoulder 120*a*. Then, the stopper 200 and the end fastener 124*a* are connected to the shaft 104. By fastening (i.e., screwing in) the end fastener 124*a* into the shaft 104, the stopper 200 pushes onto the bearing 153, which pushes onto the sleeve 170, which pushes onto the wheel 150, which pushes the seal assembly 154 towards the shaft shoulder 120*a*, which causes the deformable portion 106 to be deformed.

In more detail, when the wheel assembly 108*a* is connected to the shaft 104, the deformable portion 106 is compressed, such that the lip 130*a* is formed around the shaft shoulder 120*a*. In some embodiments, the deformable portion 106 is compressed (i.e., the seal assembly 154 is moved toward the shaft shoulder 120*a*), until the sealing cap 188 almost touches the shaft shoulder 120*a*. In some embodiments, the radial thickness of the lip 130*a* (i.e. thickness of the compressed deformable portion 106 extending beyond the shaft shoulder 120*a*) measures about 0.0001 inches. Other thicknesses are contemplated. A height of the lip 130*a* can be about 0.039 inches, about 0.078 inches, or about 0.118 inches. As mentioned above, the deformable portion 106 extends along a majority of the shaft 104. This increased area of contact between the deformable portion 106 and the shaft 104 decreases chances of the deformable portion 106 from separating from the shaft 104 due to the shear stresses that the deformable portion 106 is subjected to when compressed.

Deformation of the deformable portion 106 provides a seal between the shaft 104 and the wheel assembly 108*a*, and thereby prevents entry of elements such as water and/or debris within the hub aperture 164. As a result, life of the bearings 152, 153 can be extended. In some instances, the seal generated by the deformable portion 106 can compensate for mechanical constraints. For example, the generated seal can seal an opening between the shaft 104 and the wheel assembly 108*a* due to tolerancing clearances, or fissures and/or cracks. In other words, the generated seal can prevent entry of elements between the shaft 104 and wheel assembly 108*a*, which is generally a point of entry for element infiltration. In addition, thanks to the generated seal, the manufacturing tolerances of the shaft 104 and/or other components connected thereto can be relaxed, which decreases the overall cost of the wheel assemblies 108a, 108b.

In some embodiments, due to the stopper 200 and the end fastener 124a, the deformable portion 106 can be deformed by a desired amount.

In some embodiments, where the deformable portion 106 is made of a non-resilient material, such as aluminium, the deformable portion 106 can be permanently deformed.

Furthermore, track systems are often used in environments where portions thereof are submerged in water, snow and/or mud. The provided seals of the present technology are particularly useful in such environments to extend life of the wheels to which the seals are provided. In addition, the provided seals advantageously allow pressure washing of the wheel assemblies 108a, 108b in some cases.

Figure 7:
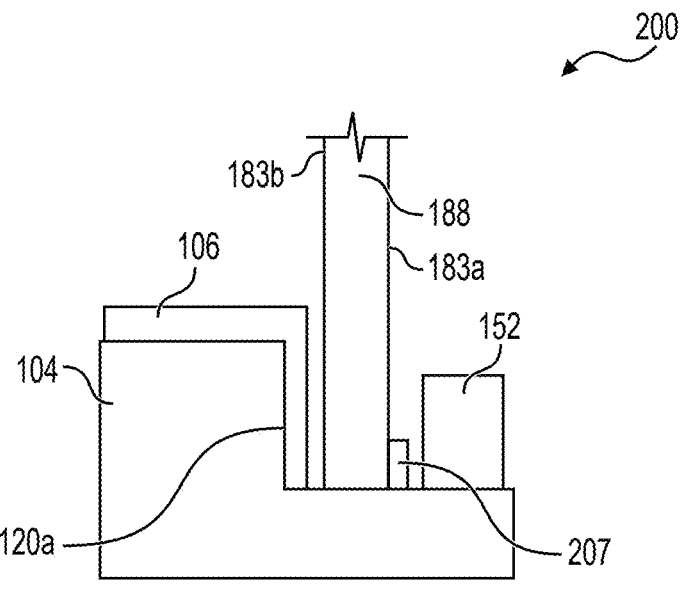
FIG. 7 is a schematic view of a portion of a support structure according to an alternative embodiment of the present technology.

Referring to FIG. 7, an alternative embodiment of the support structure 100a, namely support structure 200, will now be described. Features of the support structure 200 similar to those of the support structure 100a have been labelled with the same reference numerals and will not be described again in detail.

In this embodiment, in addition to the face seal 184 (not shown in FIG. 7) and the bearing seal 186 (not shown in FIG. 7), the support structure 200 also includes an internal deformable portion 207 that is connected to the internal side 183a of the sealing cap 188. In the present embodiment, the internal deformable portion 207 is molded to the internal side 183a of the sealing cap 188. It is contemplated that in other embodiments, the internal deformable portion 207 could be connected differently, for example via an adhesive. The internal deformable portion 207, like the deformable portion 106, is deformable to provide a seal between the shaft 104 and the wheel 150, specifically between the shaft 104 and the internal side 163 of the wheel 150. This provided seal can further prevent elements from entering within the hub aperture 164, for instance, by sealing against elements that may have passed through the seal provided by the deformable portion 106.

Figure 8:
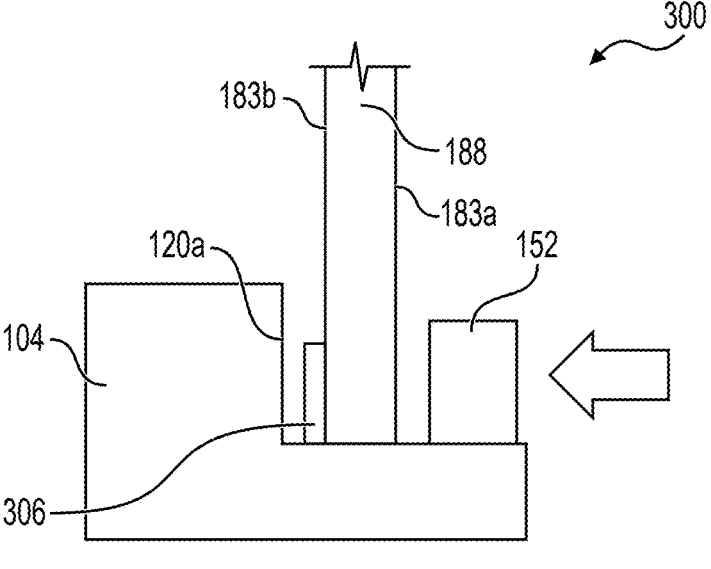
FIG. 8 is a schematic view of a portion of a support structure according to an alternative embodiment of the present technology.

Referring to FIG. 8, another alternative embodiment of the support structure 100a and the deformable portion 106, namely, respectively, support structure 300 and deformable portion 306, will now be described. Features of the support structure 300 similar to those of the support structure 100a have been labelled with the same reference numerals and will not be described again in detail.

In this embodiment, the deformable portion 306 is connected on the lateral side 183b of the sealing cap 188 rather than being connected to the shaft 104. It is to be noted that the deformable portion 306 is disposed between the shoulder 120a and the inward lateral side 162a of the wheel 150. Positioning the deformable portion 306 on the sealing cap 188 instead of the shaft 104 as described in the support structure 100a can, in some embodiments, facilitate manufacturing. Additionally, the deformable portion 306 can be less likely of separating from the sealing cap 188 than the deformable portion 106 separating from the shaft 104, as there are no shear stresses inducing the deformable portion 306 from being separated from the sealing cap 188.

Figure 9:
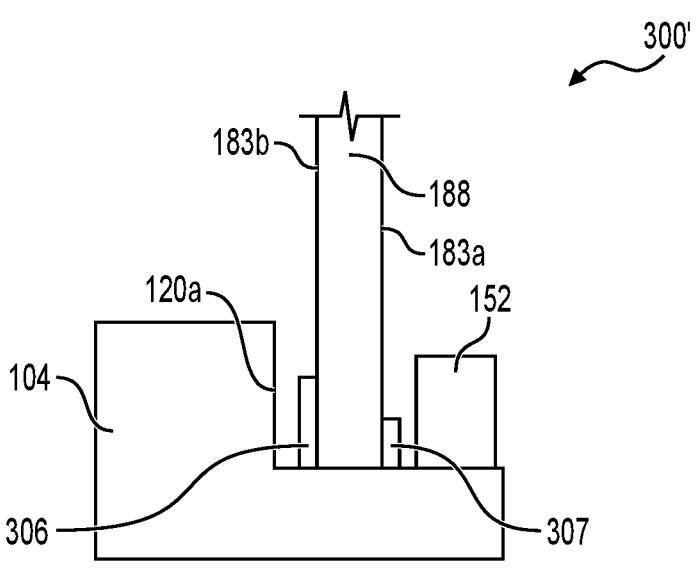
FIG. 9 is a schematic view of a portion of a support structure according to an alternative embodiment of the present technology.

Referring to FIG. 9, in some embodiments, the support structure 300' could further include an internal deformable portion 307 that is connected to the internal side 183a of the sealing cap 188. In some embodiments, the internal deformable portion 307 could be molded to the internal side 183a of the sealing cap 188. In other embodiments, the internal deformable portion 307 could be connected to the internal side 183a differently, for example via an adhesive. The internal deformable portion 307, like the deformable portion 306, is deformable to provide a seal between the shaft 104 and the wheel 150, specifically between the shaft 104 and the internal side 163 of the wheel 150. This provided seal can further prevent elements from entering within the hub aperture 164, for instance, by sealing against elements that may have passed through the seal provided by the deformable portion 106.

Figure 10:
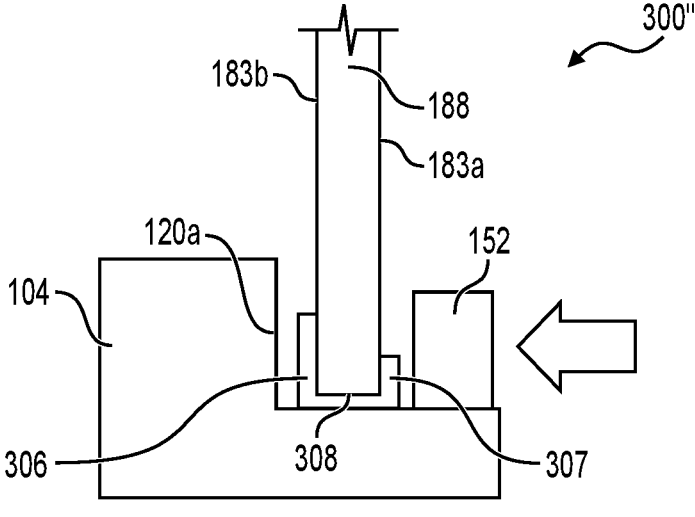
FIG. 10 is a schematic view of a portion of a support structure according to an alternative embodiment of the present technology.

Referring to FIG. 10, in some embodiments, the support structure 300" could further include a connecting deformable portion 308 that connects the deformable portion 306 and the internal deformable portion 307 to one another. The connecting deformable portion 308 could also be deformable to provide a seal between the sealing cap 188 and the shaft 104.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. A support structure for a track assembly, the support structure comprising:
   a shaft having a shoulder at one end;
   a wheel assembly connectable to the shaft such that a lateral side of the wheel assembly is engageable with the shoulder; and
   a deformable portion connected to one of the shaft and the wheel assembly, the deformable portion being disposed, when the wheel assembly is connected to the shaft, between the lateral side of the wheel assembly and the shoulder, the deformable portion being configured to, when deformed, provide a seal between the shaft and the lateral side of the wheel assembly.

2. The support structure of claim 1, wherein the shaft is made of a first material, and the deformable portion is made of a second material, the second material being more malleable than the first material.

3. The support structure of claim 2, wherein the second material is an elastomeric material.

4. The support structure of claim 1, wherein the deformable portion is molded to one of the shaft and the wheel assembly.

5. The support structure of claim 4, wherein the deformable portion is molded to the shaft and the deformable portion extends over the shoulder.

6. The support structure of claim 5, wherein the wheel assembly further includes an internal deformable portion connected to an internal side of the wheel assembly, the internal deformable portion being configured to, when deformed, provide a seal between the shaft and the internal side of the wheel assembly.

7. The support structure of claim 1, wherein the wheel assembly includes a sealing cap disposed on the lateral side of the wheel assembly, and the deformable portion is connected to a lateral side of the sealing cap.

8. The support structure of claim 7, wherein the wheel assembly further includes an internal deformable portion connected to an internal side of the sealing cap, the internal deformable portion being configured to, when deformed, provide a seal between the shaft and an internal side of the wheel assembly.

9. The support structure of claim 8, wherein the deformable portion and the internal deformable portion are connected by a connecting deformable portion.

10. The support structure of claim 1, wherein in response to the connection of the wheel assembly to the shaft, the deformable portion undergoes resilient deformation.

11. The support structure of claim 10, wherein the resilient deformation is a compressive deformation.

12. The support structure of claim 1, wherein in response to the connection of the wheel assembly to the shaft, the deformable portion deforms to form a lip.

13. The support structure of claim 12, wherein the lip has a height of about three millimetres.

14. The support structure of claim 13, further comprising adhesive between the deformable portion and the shaft.

15. The support structure of claim 1, wherein:

the shoulder is a first shoulder, the wheel assembly is a first wheel assembly, and the deformable portion is a first deformable portion;

the shaft has a second shoulder at another end; and the support structure further includes:

a second wheel assembly connectable to the shaft such that a lateral side of the second wheel assembly is engageable with the second shoulder; and a second deformable portion connected to one of the shaft and the second wheel assembly, and being disposed, when the second wheel assembly is connected to the shaft, between the lateral side of the second wheel assembly and the second shoulder, and the deformable portion being configured to, when deformed, provide a seal between the shaft and the lateral side of the second wheel assembly.

16. The support structure of claim 15, wherein the second deformable portion is molded to one of the shaft and the second wheel assembly.

17. The support structure of claim 15, wherein the first and second deformable portions are separate from one another.

18. The support structure of claim 15, wherein the first and second deformable portions are interconnected by an intermediate deformable portion forming a continuous deformable layer.

19. A support structure for a track system, the support structure comprising:

a shaft having a first shoulder at a first end and a second shoulder at a second end;

a first wheel assembly connectable to the shaft at the first end such that a lateral side of the first wheel assembly is engageable with the first shoulder;

a second wheel assembly connectable to the shaft at the second end such that a lateral side of the second wheel assembly is engageable with the second shoulder;

a first deformable portion connected to the shaft and extending over the first shoulder, the first deformable portion being configured to, in response to being deformed, provide a seal between the shaft and the lateral side of the first wheel assembly; and a second deformable portion connected to the shaft and extending over the second shoulder, the second deformable portion being configured to, in response to being deformed, provide a seal between the shaft and the lateral side of the second wheel assembly.

20. A support structure connectable to a frame of a track system, the support structure comprising:

a resilient member connectable to the frame;

a shaft fixedly connected to the resilient member, the shaft being configured to connect with at least one wheel assembly;

a guiding member connected to the resilient member, the guiding member being engageable to an endless track of the track system to limit movement of the shaft, and wherein the resilient member biases the shaft and the guiding member toward a first position.

* * * * *